(12) United States Patent
Su

(10) Patent No.: US 11,162,526 B2
(45) Date of Patent: Nov. 2, 2021

(54) GROOVED WASHER

(71) Applicant: GUANGZHE ENTERPRISE CO., LTD., Kaohsiung (TW)

(72) Inventor: Fu Cheng Su, Kaohsiung (TW)

(73) Assignee: GUANGZHE ENTERPRISE CO., LTD., Kaohsiung (TW)

( * ) Notice: Subject to any disclaimer, the term of this patent is extended or adjusted under 35 U.S.C. 154(b) by 224 days.

(21) Appl. No.: 16/549,678

(22) Filed: Aug. 23, 2019

(65) Prior Publication Data
US 2021/0054870 A1 Feb. 25, 2021

(51) Int. Cl.
*F16B 43/00* (2006.01)

(52) U.S. Cl.
CPC .................. *F16B 43/001* (2013.01)

(58) Field of Classification Search
CPC ..................................... F16B 43/001
USPC .................................. 411/443, 531
See application file for complete search history.

(56) References Cited

U.S. PATENT DOCUMENTS

| | | | | |
|---|---|---|---|---|
| 3,850,042 A * | 11/1974 | Lifferth | ................... | F16H 27/08 74/84 R |
| 4,712,802 A * | 12/1987 | Hewison | ............... | F16B 43/001 411/542 |
| 5,183,267 A * | 2/1993 | Ackerman | ............ | F16B 43/001 277/630 |
| 6,811,366 B2 * | 11/2004 | Chen | ....................... | F16B 43/00 206/346 |
| 6,814,231 B2 * | 11/2004 | Gupta | ..................... | F16B 15/08 206/343 |
| 7,059,612 B2 * | 6/2006 | Kuribayashi | ......... | F16B 43/001 277/637 |
| 7,131,809 B2 * | 11/2006 | Dobson | ................. | F16B 5/0258 411/533 |
| 7,780,153 B2 * | 8/2010 | Haubrich | .............. | F16F 1/3732 267/140.13 |
| 8,033,394 B2 * | 10/2011 | Nakagawa | .............. | F16B 15/08 206/343 |
| 8,616,818 B2 * | 12/2013 | Travis | ................... | F16B 41/002 411/533 |
| 9,958,025 B2 * | 5/2018 | Kuraishi | ................. | F16F 15/08 |
| 2011/0226016 A1 * | 9/2011 | Howard | ................... | A44C 7/00 63/12 |
| 2013/0333105 A1 * | 12/2013 | Monat | ..................... | E03D 11/16 4/252.4 |

* cited by examiner

*Primary Examiner* — Gary W Estremsky
(74) *Attorney, Agent, or Firm* — Rabin & Berdo, P.C.

(57) ABSTRACT

A grooved washer is used on a screw carrier tape and has a ring body. The ring body has an outer side face, a groove, two groove walls, and a perforation. The groove is annularly formed in the outer side face. The two groove walls are oppositely defined in the groove. The perforation is formed through a center of the ring body and through the top surface of the ring body and the bottom surface of the ring body. Moreover, the grooved washer has a metal gasket which is attached to the top surface of the ring body. With the groove, the grooved washer limits the carrier tape to be stuck on the screw carrier tape so that screws are stably located in the positioning apertures without falling from the screw carrier tape and being scattered, so as to improve the convenience in use.

8 Claims, 7 Drawing Sheets

GROOVED WASHER

BACKGROUND OF THE INVENTION

1. Field of the Invention

The present invention relates to a grooved washer, and more particularly to a grooved washer that may be stuck on a screw carrier tape stably.

2. Description of Related Art

Generally, a screw is a fastening unit for screwing objects, and two of the objects are screwed together with the screw passing through the two objects. The screw would be mounted with a washer, in order to allow the screw to fasten the objects in a stable and waterproof manner. When the two objects are screwed together, the washer is clamped by a head of the screw and one of the objects. Thus, the washer can abut on said one of the objects to close a gap between the screw and said one of the objects. Moreover, abutting of the washer allows the screw to stably fasten the two objects, so as to form good fastening stability and waterproofness.

During the foregoing process of mounting the washer on the screw before fastening, when the number of the screws to be fastened is increased, it is inconvenient for the user to take one of the screws from the plurality of screws because the screw is small. In order to solve the inconvenience, a screw carrier tape that can be placed with multiple screws sequentially thereon is provided. The screw carrier tape comprises a carrier tape having a plurality of spaced positioning apertures. Each positioning aperture is surrounded by a plurality of bendable support pieces. The multiple screws are mounted on the carrier tape by respectively mounting through the positioning apertures. The washer on each screw will abut on the plurality of the bendable support pieces, or the washer will be enclosed in the positioning aperture, thereby preventing the head of the screw from directly passing the positioning aperture. The washer is clamped by the carrier tape and the head end of the screw. The screw carrier tape allows the user to carry multiple screws at a time, and can neatly remove the screws with the washers from the screw carrier tape.

However, when the user carries the screw carrier tape, the screw carrier tape may be placed upside down. Although the plurality of bendable support pieces support the screw so that the head of the screw does not pass through the positioning aperture, the screw slides out of the positioning aperture when the screw is placed upside down. Otherwise, as long as an outer surface of the washer mounted on the screw is smooth, the washer may still slide out from the positioning aperture on the carrier tape. Accordingly, the screw will slide out of the positioning aperture with the head end of the screw passing through the positioning aperture. There is no mutual fixing structure between the washer and the carrier tape. During carrying of the screw carrier tape, the screws may drop from the carrier tape in the way that the heads of the screws pass through the positioning apertures, causing the screws to be scattered and difficult to take along.

To overcome the shortcomings, the present invention provides a grooved washer to obviate the aforementioned problems.

SUMMARY OF THE INVENTION

The main objective of the invention is to provide a grooved washer that solves the problem that there is no mutual fixing structure between the washer and the carrier tape, such that the screw may drop from the carrier tape in the way that the head of the screw passes through the positioning aperture, causing the screws to be scattered and difficult to take along.

The grooved washer is used on a screw carrier tape. The grooved washer comprises a ring body. The ring body has an outer side face, a groove, two groove walls, and a perforation. The groove is annularly formed in the outer side face. The two groove walls are oppositely defined in the groove and respectively disposed adjacent to a top surface of the ring body and a bottom surface of the ring body. The perforation is formed through a center of the ring body and through the top surface of the ring body and the bottom surface of the ring body.

In another aspect, the grooved washer is used on a screw carrier tape and comprises a ring body and a metal gasket. The ring body has an outer side face, a groove, a base wall, and a perforation. The groove is annularly formed in the outer side face and through the top surface of the ring body. The base wall is a bottom wall of the groove and adjacent to the bottom surface of the ring body. The perforation is formed through a center of the ring body and through the top surface of the ring body and the bottom surface of the ring body.

The metal gasket is attached to the top surface of the ring body and has an outer peripheral edge, a restriction part, and a hole. The outer peripheral edge radially protrudes from the top surface of the ring body. The restriction part is defined on a bottom of the metal gasket and is opposite the base wall. The restriction part is a top wall of the groove, and the base wall and the restriction part limit a carrier tape of the screw carrier tape, so that the grooved washer can be stuck on the carrier tape. The hole is formed through a center of the metal gasket and communicates with the perforation. The metal gasket tapers from a top end of the hole to the outer peripheral.

The grooved washer in accordance with the present invention provides the groove of the ring body. When a screw passes through the perforation and is put into the screw carrier tape, the screw carrier tape contacts the outer side face of the ring body. The hole edge defined around the positioning aperture protrudes into the groove, so that the screw carrier tape is limited by the two groove walls when the user carries the screw carrier tape and the screw carrier tape is put upside down. The grooved washer is stably combined with the carrier tape, so that the screw is stably located in the positioning aperture without falling from the screw carrier tape, so as to improve the convenience in use.

Furthermore, the grooved washer has the metal gasket. The restriction part of the metal gasket and the base wall can limit the screw carrier tape when the user passes a screw through the perforation and puts the screw into the screw carrier tape. The screw carrier tape is limited by the restriction part and the base wall so that the grooved washer can be stuck on the carrier tape without falling from the screw carrier tape, so as to improve the convenience in use. Moreover, the metal gasket allows the user to directly fasten the screw on an outer side wall of a house or an outer side of a roof to effectively block the leakage of liquid or gas.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1, 4, 6, and 8, a grooved washer in accordance with the present invention is used on a screw carrier tape 40, and the grooved washer comprises a ring body 10A, 10B, 10C.

Figure 1:
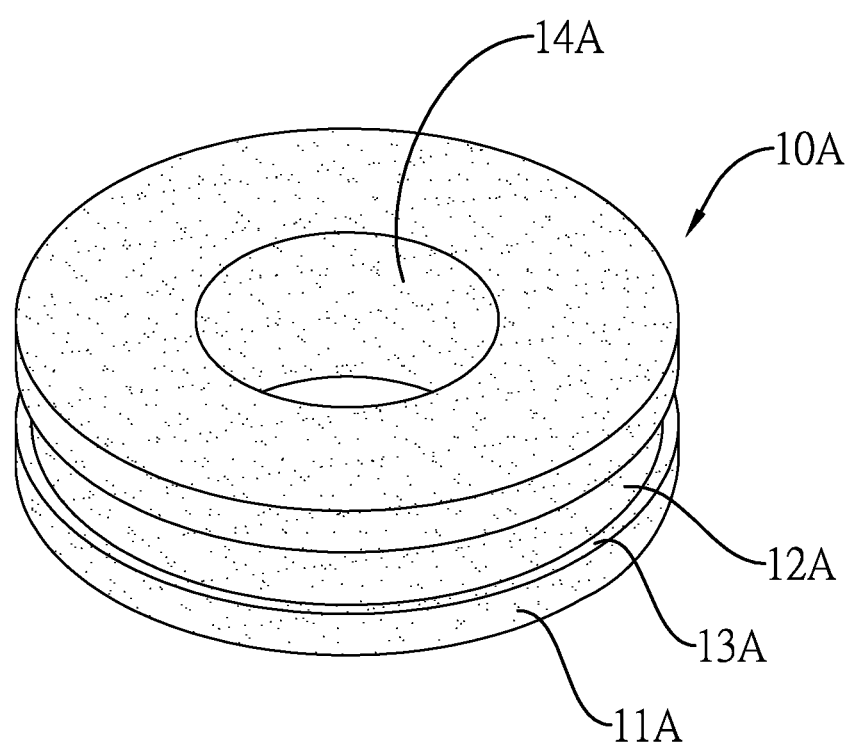
FIG. 1 is a perspective view of a first embodiment of a grooved washer in accordance with the present invention.
Figure 2:
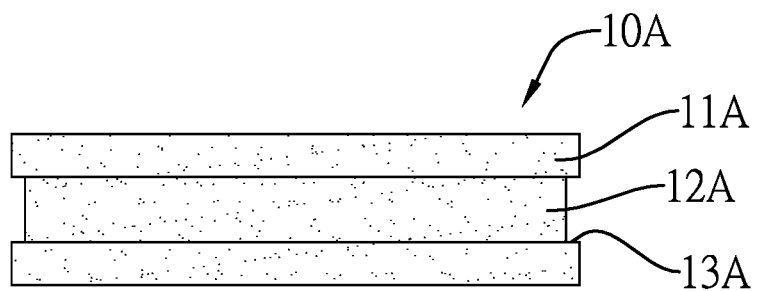
FIG. 2 is a side view of the grooved washer in FIG. 1.
Figure 3:
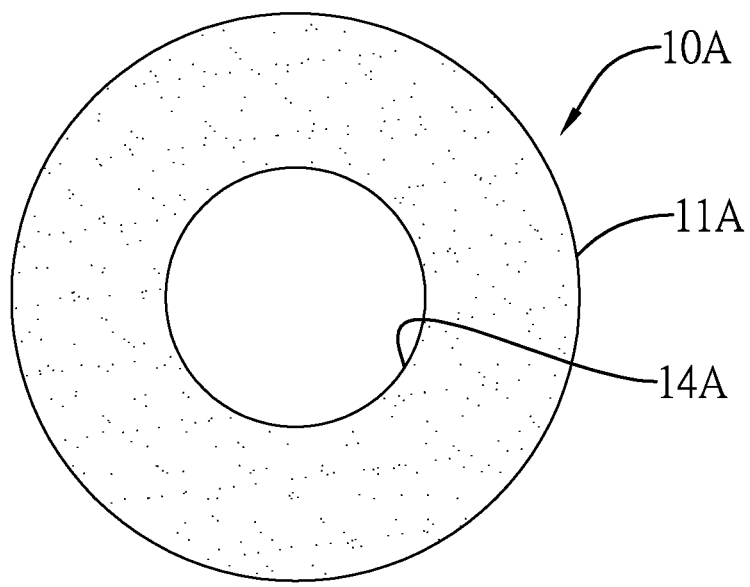
FIG. 3 is a top view of the grooved washer in FIG. 1.

With reference to FIGS. 1 to 3, in a first preferred embodiment of the grooved washer, the ring body 10A has an outer side face 11A, a groove 12A, two groove walls 13A, and a perforation 14A. The groove 12A is annularly formed in the outer side face 11A. The two groove walls 13A are oppositely defined in the groove 12A and respectively disposed adjacent to a top surface of the ring body 10A and a bottom surface of the ring body 10A. The perforation 14A is formed through a center of the ring body 10A and through the top surface of the ring body 10A and the bottom surface of the ring body 10A. Specifically, the ring body 10A is made of a material such as rubber or silicone.

Figure 8:
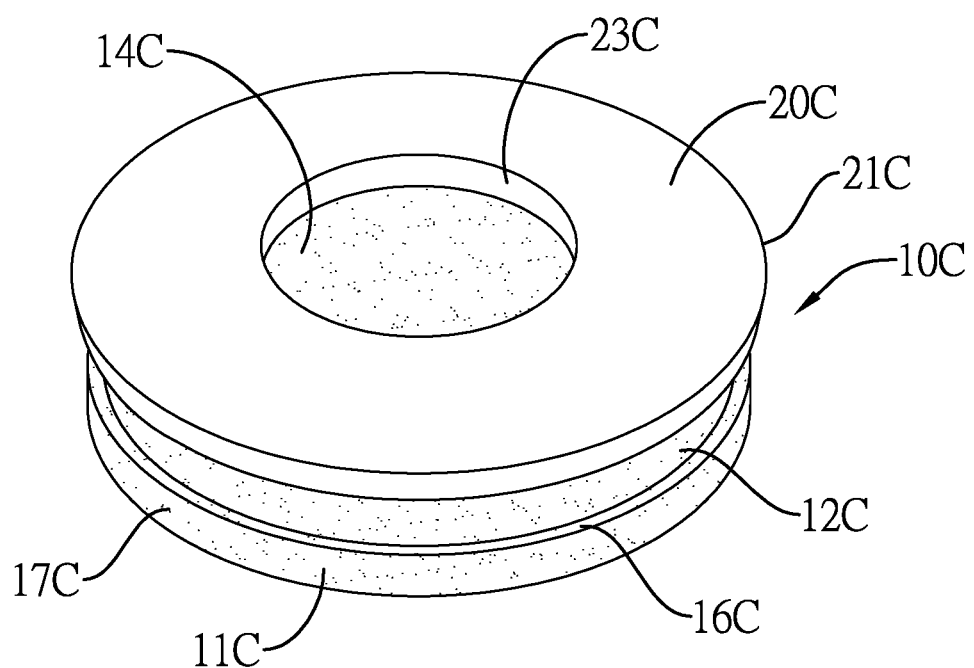
FIG. 8 is a perspective view of a third embodiment of a grooved washer in accordance with the present invention.
Figure 9:
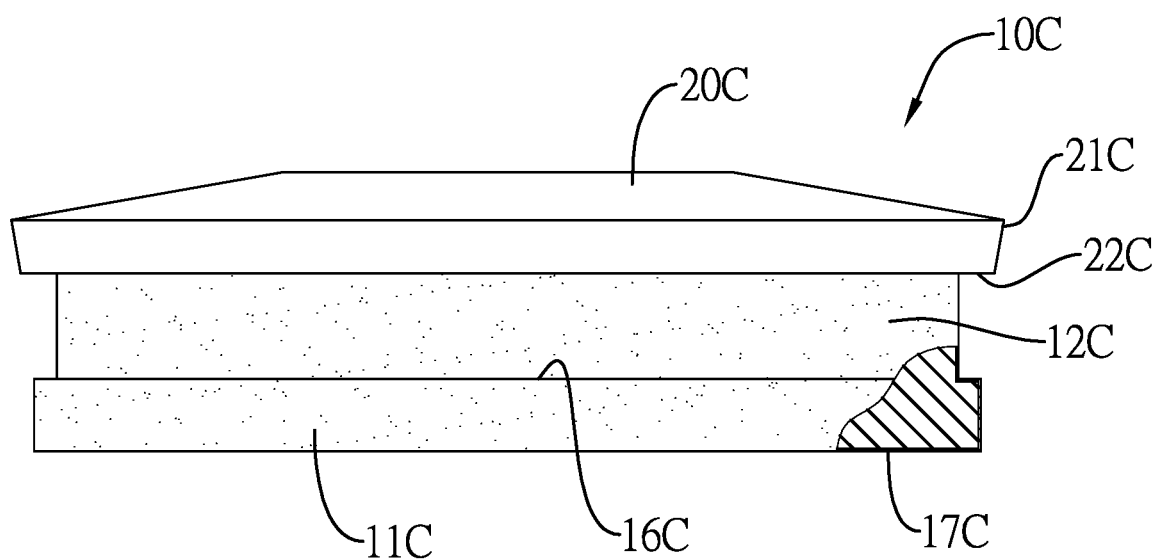
FIG. 9 is a side view in partial section of the grooved washer in FIG. 8.

With reference to FIGS. 8 and 9, in a third preferred embodiment of the grooved washer, the grooved washer has the ring body 10C and a metal gasket 20C. The ring body 10C has the outer side face 11C, the groove 12C, a base wall 16C, and the perforation 14C. The groove 12C is annularly formed in the outer side face 11C and adjacent to the top surface of the ring body 10C. The base wall 16C is defined in the groove 12C and adjacent to the bottom surface of the ring body 10C. The perforation 14C is formed through the center of the ring body 10C and through the top surface of the ring body 10C and the bottom surface of the ring body 10C. The metal gasket 20C is attached to the top surface of the ring body 10C and has an outer peripheral edge 21C, a restriction part 22C, and a hole 23C. The outer peripheral edge 21C radially protrudes from the top surface of the ring body 10C. The restriction part 22C is defined on a bottom of the metal gasket 20C and is opposite the base wall 16C. The restriction part 22C is a top wall of the groove 12C. The hole 23C is formed through a center of the metal gasket 20C and communicates with the perforation 14C. The metal gasket 20C tapers from the outer peripheral edge 21C to the hole. The ring body 10C is made of a material such as rubber or silicone. Specifically, the ring body 10C has a coating layer 17C coated on the ring body 10C, and a color of the coating layer 17C is the same as a color of the metal gasket 20C.

Figure 4:
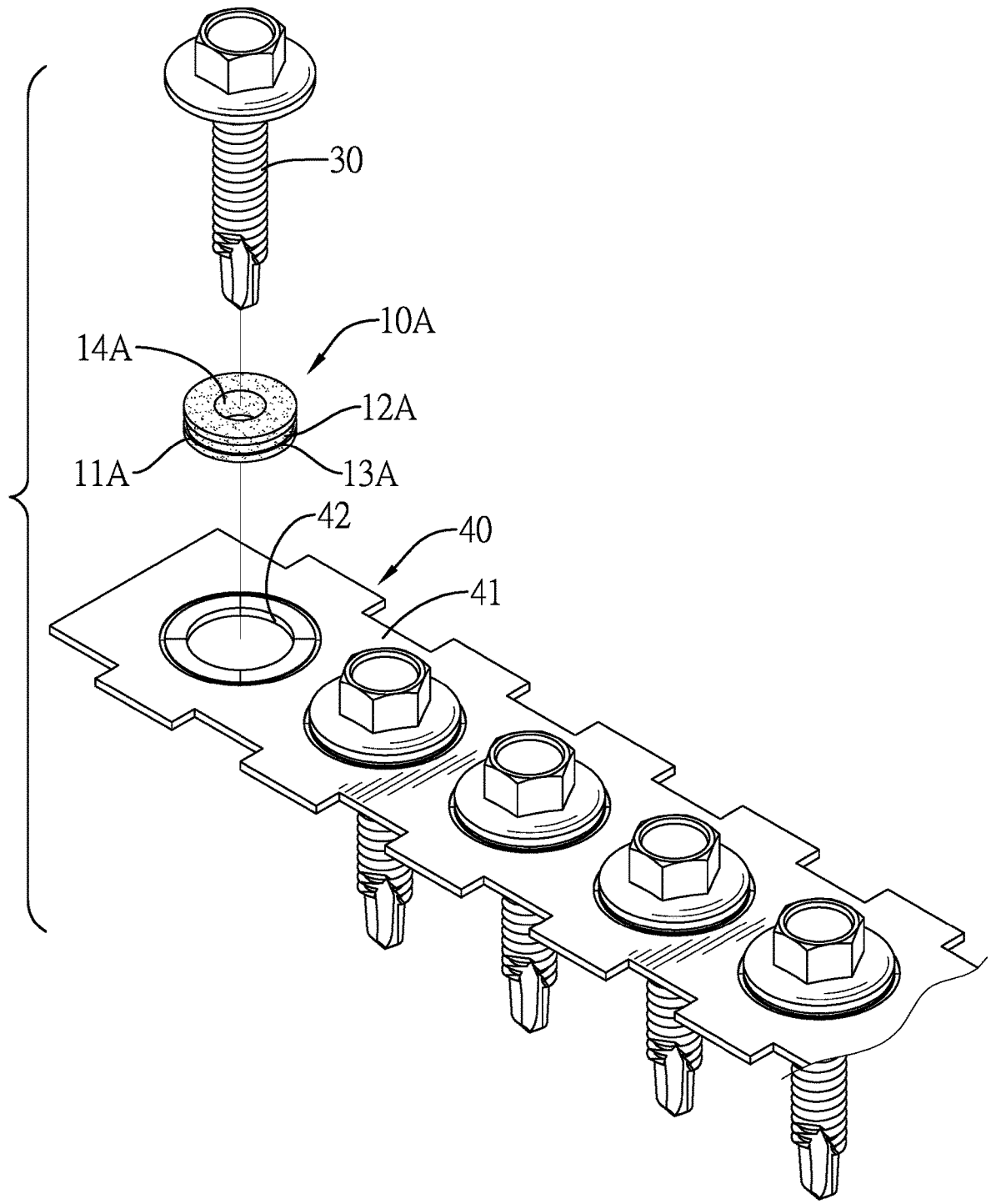
FIG. 4 is an operational and partially exploded perspective view of the grooved washer in FIG. 1, showing the screws set in the grooved washer and mounted on the carrier tape.
Figure 5:
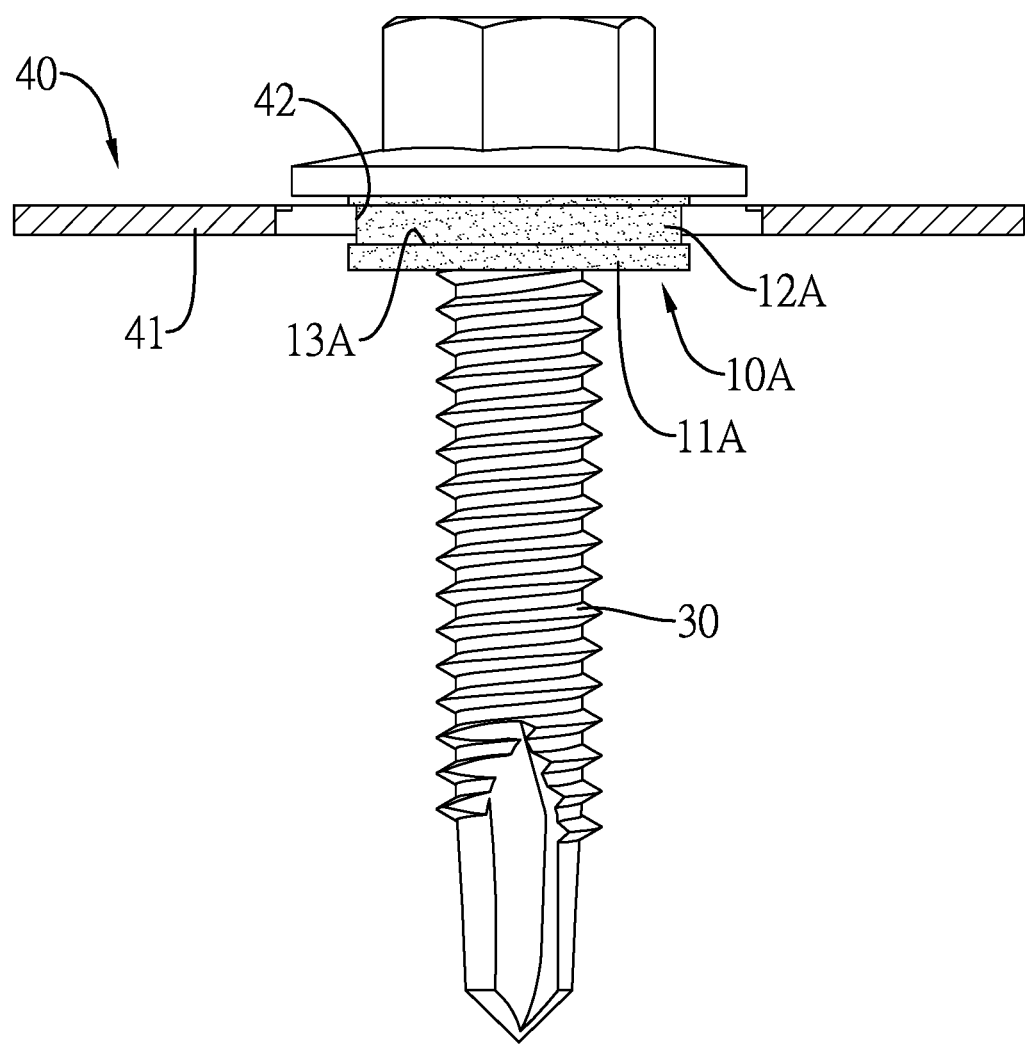
FIG. 5 is a side view in partial section of the grooved washer in FIG. 1, showing the screw sets in the grooved washer and mounted on the carrier tape.

When the grooved washer is in use, with reference to FIGS. 1, 4, and 5, in the first preferred embodiment of the grooved washer, a screw 30 passes through the perforation 14A of the grooved washer and passes through the screw carrier tape 40. The screw carrier tape 40 has a carrier tape 41 and a plurality of positioning apertures 42. The positioning apertures 42 are spaced apart on the carrier tape 41 and each of the positioning apertures 42 is formed through the carrier tape 41. The screw carrier tape 40 can be placed with multiple screws 30 thereon. Each of the screws 30 is mounted with the grooved washer. The multiple screws 30 pass through the plurality of positioning apertures 42 respectively. The grooved washer abuts against the carrier tape 41 and the user continues to press the screw 30 on a head of the screw 30 to push the grooved washer into the positioning aperture 42. Thus, a hole edge defined around the positioning aperture 42 protrudes into the groove 12A of the ring body 10A, so that the hole edge of the positioning aperture 42 is located between the two groove walls 13A. The two groove walls 13A of the ring body 10A limit the carrier tape 41, so that the grooved washer can be stuck on the carrier tape 41. When the user carries the screw carrier tape 40 and the screw carrier tape 40 is put upside down, the grooved washer is stably combined with the carrier tape 41, so that the screw 30 is stably located in the positioning aperture 42 without falling from the screw carrier tape 40, so as to improve the convenience in use.

Figure 6:
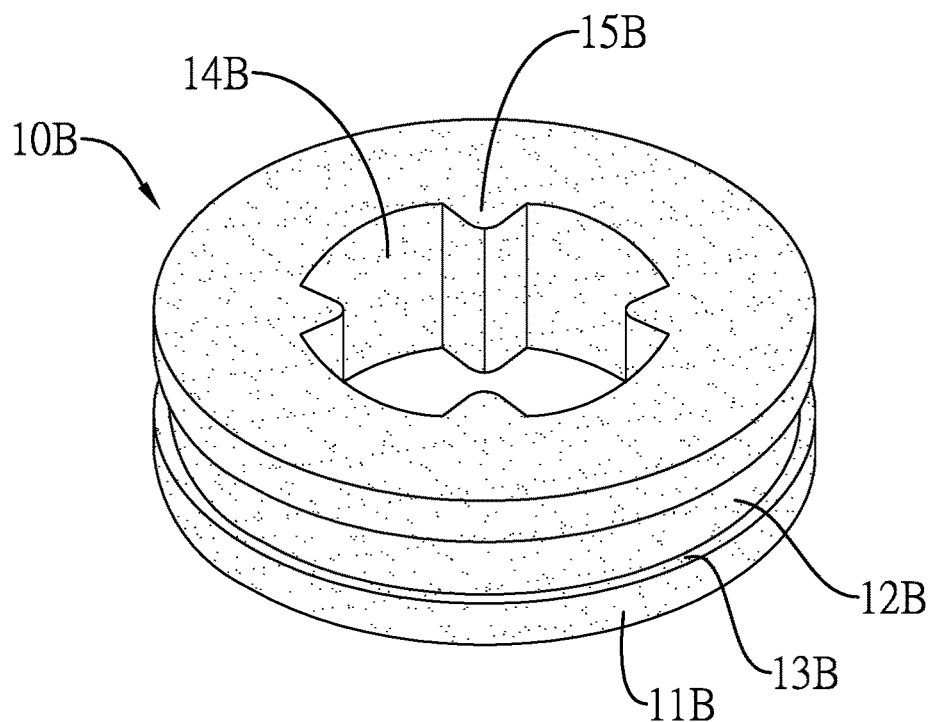
FIG. 6 is a perspective view of a second embodiment of a grooved washer in accordance with the present invention.
Figure 7:
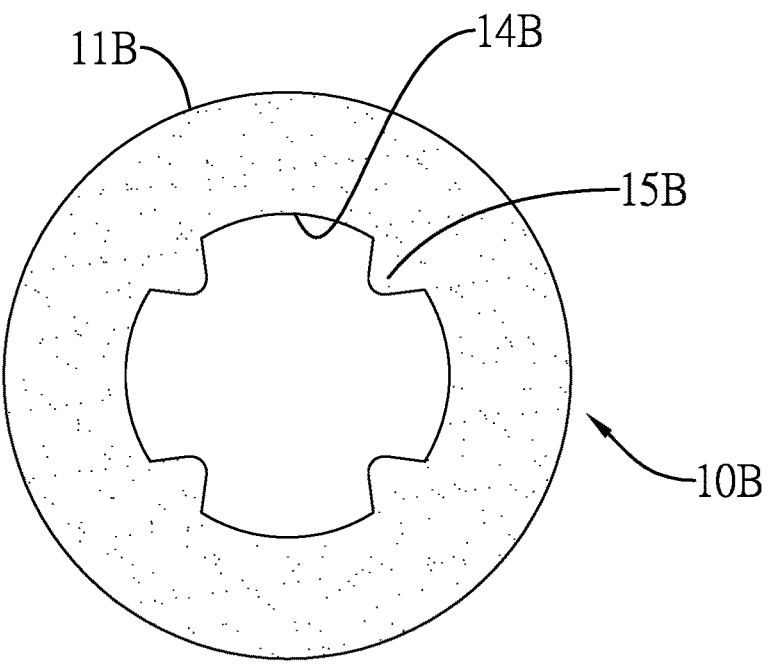
FIG. 7 is a top view of the grooved washer in FIG. 6.

When the grooved washer is in use, with reference to FIGS. 4, 6, and 7, in the second preferred embodiment of the grooved washer, the multiple protrusions 15B of the ring body 10B could grasp a middle portion of the screw 30 when the screw 30 passes through the perforation 14B. Thus, stability of the screw 30 located in the perforation 14B is improved. Accordingly, it is more convenient for the user to carry the screw carrier tape 40.

Figure 10:
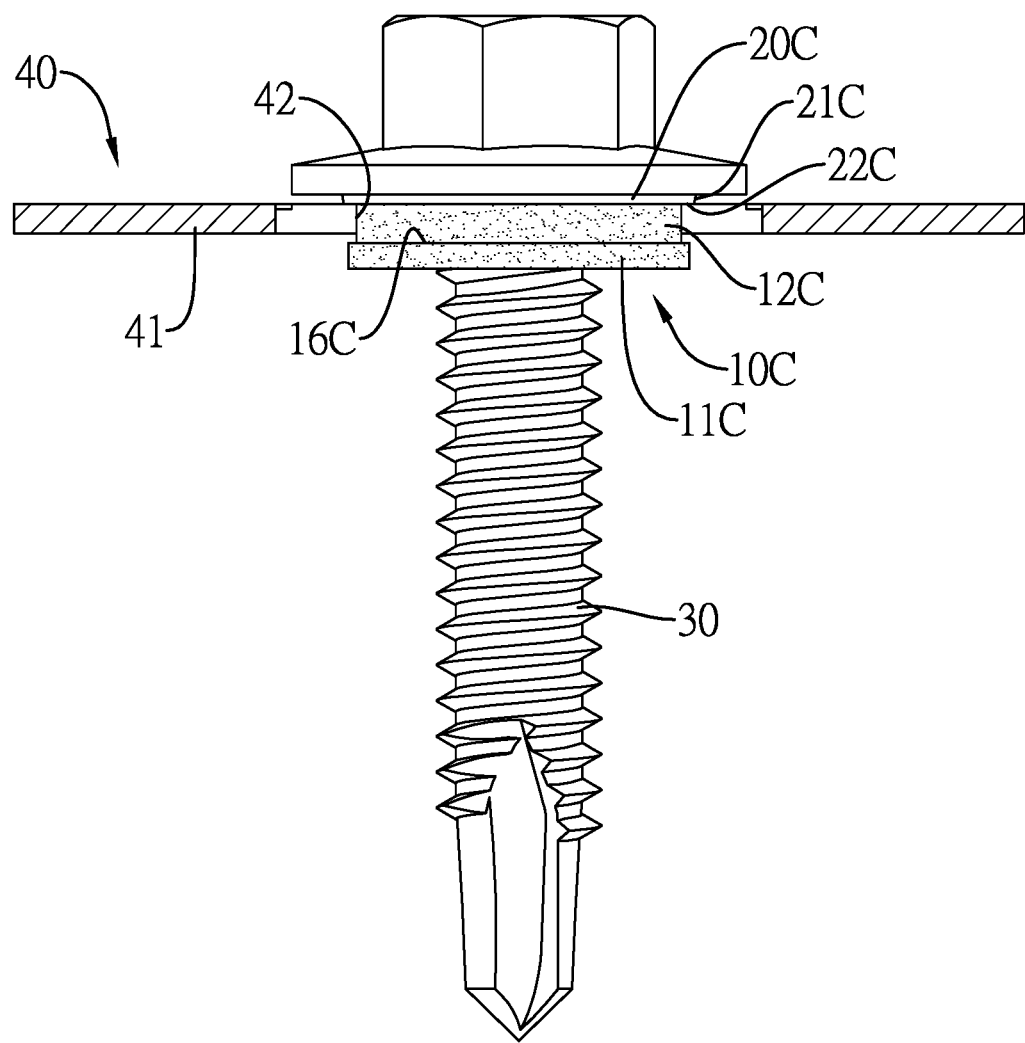
FIG. 10 is a cross-sectional side view of the grooved washer in FIG. 8, showing the screw sets in the grooved washer and mounted on the carrier tape.

When the grooved washer is in use, with reference to FIGS. 8 to 10, in the third preferred embodiment of the grooved washer, the grooved washer has the metal gasket 20C. The screw 30 is mounted with the grooved washer and is mounted on the screw carrier tape 40. The multiple screws 30 pass through the plurality of positioning apertures 42 respectively. The grooved washer abuts against the carrier tape 41 and the user continues to press the screw 30 on the head of the screw 30 to push the grooved washer into the positioning aperture 42. Thus, the hole edge defined around the positioning aperture 42 protrudes into the groove 12A of the ring body 10A, so that the hole edge of the positioning aperture 42 is located between the base wall 16C and the restriction part 22C. The base wall 16C and the restriction part 22C limit the carrier tape 41, so that the grooved washer can be stuck on the carrier tape 41. When the user carries the screw carrier tape 40 and the screw carrier 40 is put upside down, the grooved washer is stably combined with the carrier tape 41, so that the screw 30 is stably located in the positioning aperture 42 without falling from the screw carrier tape 40, so as to improve the convenience in use. Moreover, the metal gasket 20C facilitates the user to directly fasten the screw 30 on an outer side of a house or an outer side wall of a roof to effectively block the leakage of liquid or gas. Moreover, with the coating layer 17C of the ring body 10C, a color of the ring body 10C is the same as the color of the metal gasket 20C to improve consistency of the grooved washer with the house or the roof and increase the usage of the grooved washer. The color of the ring body 10C and the color of the metal gasket 20C are not limited to be the same.

Furthermore, because the ring body 10A is made of the material such as rubber or silicone, the ring body 10A has good elasticity. When the user fastens the screw 30, the ring body 10A can be elastically held between the head of the screw 30 and the carrier tape 41 to form a good leak-proof sealing. Because of the material such as rubber or silicone, the grooved washer can be used in a high-temperature occasion.

The grooved washer of the present invention has the following advantages. With the groove 12A, the ring body 10A is stuck on the screw carrier tape 40 when the screw 30 is mounted by the ring body 10A and is placed on the screw carrier tape 40. The ring body 10A limits the carrier tape 41 so that the screw 30 is stably located in the positioning aperture 42 to prevent the screw 30 from dropping, so as to improve the convenience in use.

What is claimed is:

1. A grooved washer connected with a screw carrier tape, the grooved washer comprising:
   a ring body having
      an outer side face;
      a groove annularly formed in the outer side face and adjacent to a top surface of the ring body; the groove being engaged with the screw carrier tape
      a base wall being a bottom wall of the groove and adjacent to a bottom surface of the ring body; and
      a perforation formed through a center of the ring body and through the top surface of the ring body and the bottom surface of the ring body; and
   a metal gasket attached to the top surface of the ring body and protruded from the top surface of the ring body, the metal gasket having
      an outer peripheral edge radially protruded from the top surface of the ring body;
      a restriction part defined on a bottom of the metal gasket and opposite to the base wall, wherein the restriction part is a top wall of the groove, and the base wall and the restriction part limit a carrier tape of the screw carrier tape, so that the grooved washer is stuck on the carrier tape; and
   a hole formed through a center of the metal gasket and communicating with the perforation.

2. The grooved washer as claimed in claim 1, wherein the metal gasket tapers from a top end of the hole to the outer peripheral edge.

3. The grooved washer as claimed in claim 2, wherein the ring body is made of rubber or silicone.

4. The grooved washer as claimed in claim 3, wherein the ring body has a coating layer coated on the ring body, and a color of the coating layer is the same as a color of the metal gasket.

5. The grooved washer as claimed in claim 2, wherein the ring body has a coating layer coated on the ring body, and a color of the coating layer is the same as a color of the metal gasket.

6. The grooved washer as claimed in claim 1, wherein the ring body is made of rubber or silicone.

7. The grooved washer as claimed in claim 6, wherein the ring body has a coating layer coated on the ring body, and a color of the coating layer is the same as a color of the metal gasket.

8. The grooved washer as claimed in claim 1, wherein the ring body has a coating layer coated on the ring body, and a color of the coating layer is the same as a color of the metal gasket.

\* \* \* \* \*